United States Patent
Gordon et al.

(10) Patent No.: US 11,739,258 B2
(45) Date of Patent: Aug. 29, 2023

(54) PROPPANT PARTICULATES FORMED FROM POLYAROMATIC HYDROCARBONS

(71) Applicant: ExxonMobil Technology and Engineering Company, Annandale, NJ (US)

(72) Inventors: Peter A. Gordon, Yardley, PA (US); Huaxing Daniel Zhou, Warwick, PA (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 0 days.

(21) Appl. No.: 18/146,830

(22) Filed: Dec. 27, 2022

(65) Prior Publication Data

US 2023/0132325 A1    Apr. 27, 2023

Related U.S. Application Data

(62) Division of application No. 16/683,156, filed on Nov. 13, 2019, now Pat. No. 11,566,170.

(60) Provisional application No. 62/784,886, filed on Dec. 26, 2018.

(51) Int. Cl.
*C09K 8/68* (2006.01)
*C09K 8/80* (2006.01)
*E21B 43/267* (2006.01)

(52) U.S. Cl.
CPC ............. *C09K 8/685* (2013.01); *C09K 8/80* (2013.01); *E21B 43/267* (2013.01)

(58) Field of Classification Search
CPC .......... C09K 8/685; C09K 8/80; E21B 43/267
See application file for complete search history.

(56) References Cited

U.S. PATENT DOCUMENTS

| | | | | |
|---|---|---|---|---|
| 3,089,542 A | * | 5/1963 | Kolodny | ............... C08F 283/01 166/280.1 |
| 2017/0349814 A1 | * | 12/2017 | Gupta | ..................... E21B 43/04 |

* cited by examiner

*Primary Examiner* — Crystal J. Lee
(74) *Attorney, Agent, or Firm* — Vorys, Sater, Seymour and Pease LLP

(57) ABSTRACT

Proppant particulates are commonly used in hydraulic fracturing operations to maintain one or more fractures in an opened state following the release of hydraulic pressure. In complex fracture networks, it can be difficult to deposit proppant particulates fully within the fractures. In addition, low crush strengths may result in problematic fines formation. Polyaromatic hydrocarbons, commonly encountered in various refinery process streams, may serve as an advantageous precursor to proppant particulates. Polyaromatic hydrocarbons may undergo crosslinking under acid-catalyzed conditions in an aqueous solvent in the presence of a surfactant to form substantially spherical particulates that may serve as effective proppant particulates during fracturing operations. In situ formation of the proppant particulates may take place in some cases.

7 Claims, No Drawings

PROPPANT PARTICULATES FORMED FROM POLYAROMATIC HYDROCARBONS

CROSS-REFERENCE TO RELATED APPLICATIONS

This application claims the benefit to U.S. Provisional Application Ser. No. 62/784,886, filed Dec. 26, 2018, and U.S. patent application Ser. No. 16/683,156, filed Nov. 13, 2019, the disclosures of which is herein incorporated by reference in their entirety.

FIELD

The present disclosure relates to fracturing operations and proppant particulates employed therein.

BACKGROUND

A wellbore may be drilled into a subterranean formation in order to promote removal (production) of a hydrocarbon resource therefrom. In many cases, the subterranean formation needs to be stimulated in some manner in order to promote more effective removal of the hydrocarbon resource. Stimulation operations may include any operation performed upon the matrix of a subterranean formation in order to improve fluid conductivity therethrough.

Stimulation operations may include processes such as acidizing, fracturing, or a combination thereof. Acidizing operations dissolve a portion of the matrix of a subterranean formation to promote more effective fluid flow therethrough. Fracturing operations, in contrast, pump large quantities of fluid into a subterranean formation under high hydraulic pressure to promote formation of a plurality of fractures (channels) within the matrix of the subterranean formation to create a high-conductivity flow path. Both primary fractures extending from the wellbore and secondary fractures extending from the primary fractures, possibly dendritically, may be formed during a fracturing operation.

Proppant particulates are often included in a fracturing fluid in order to keep the fractures open after the hydraulic pressure has been released following a fracturing operation. Highly viscous fluids, often employing a polymer gel, may be employed to promote effective transport of the proppant particulates. Upon reaching the fractures, the proppant particulates settle therein, thereby preventing the fractures from closing once the hydraulic pressure has been released.

There are oftentimes difficulties encountered during fracturing operations, particularly associated with deposition of proppant particulates in fractures that have been created or extended under hydraulic pressure. Because proppant particulates are often fairly dense materials, effective transport of the proppant particulates may be difficult, even when employing gelled fracturing fluids. Even aided by a gelled fracturing fluid, it can still be difficult to distribute proppant particulates into the more remote reaches of a network of fractures. In addition, fines produced from crushing of proppant particulates within a wellbore can also lessen fluid conductivity, which may decrease production rates and/or necessitate wellbore cleanout operations. Moreover, the polymer gels commonly used to promote effective transport of proppant particulates may not completely break following a fracturing operation, which may lead to formation damage and decreased hydrocarbon resource production.

SUMMARY

In some embodiments, the present disclosure provides solid compositions that may be used as proppant particulates. The solid compositions comprise: a crosslinked reaction product of a polyaromatic hydrocarbon and a crosslinking agent. The crosslinking agent comprises at least two functional groups that are reactive under acid-catalyzed conditions with an aromatic ring of the polyaromatic hydrocarbon. The crosslinked reaction product is formed as substantially spherical particulates.

In other embodiments, the present disclosure provides methods for making substantially spherical particulates from a polyaromatic hydrocarbon. The methods comprise: reacting a polyaromatic hydrocarbon with a crosslinking agent in the presence of an acid catalyst and a surfactant in an aqueous solvent, and forming substantially spherical particulates in situ in the aqueous solvent. The substantially spherical particulates comprise a crosslinked reaction product of the polyaromatic hydrocarbon and the crosslinking agent.

In still other embodiments, the present disclosure provides methods for fracturing a subterranean formation. The fracturing methods comprise: providing a plurality of proppant particulates comprising a crosslinked reaction product of a polyaromatic hydrocarbon and a crosslinking agent, the crosslinked reaction product being formed as substantially spherical particulates; introducing a fracturing fluid comprising the plurality of proppant particulates into a subterranean formation; and depositing at least a portion of the plurality of proppant particulates within one or more fractures in the subterranean formation.

DETAILED DESCRIPTION

The present disclosure generally relates to fracturing and, more specifically, to proppant particulates for fracturing that are formed from various polyaromatic hydrocarbon sources.

As discussed above, proppant particulates can be used effectively during fracturing operations, but there may be issues associated with their use. First, the high densities of many common proppant particulates may hinder particulate transport, possibly leading to inadequate proppant disposition within a plurality of fractures. Second, some proppant particulates are prone to fines formation due to low crush strength values, which may lead to decreased fracture conductivity due to fines accumulation within a wellbore. Finally, polymeric gels used to promote transport of proppant particulates can themselves be problematic if they are not effectively removed from the fractures within a wellbore. Low-density proppant particulates may address the foregoing difficulties, at least in part, but they are oftentimes rather high in cost.

The present disclosure alleviates the foregoing difficulties and provides related advantages as well. In particular, the present disclosure provides proppant particulates that may exhibit low densities and high crush strengths, thereby addressing two significant shortcomings of traditional proppant particulates, such as sand and ceramics. The low density values may decrease or eliminate the need to utilize a gelled polymer to promote effective transport of the proppant particulates. Moreover, the proppant particulates disclosed herein may be formed readily from various low-cost polyaromatic hydrocarbon sources, such as those produced from various refinery process streams having high aromaticity that may otherwise have rather low intrinsic value. Illustrative polyaromatic hydrocarbon sources that may be suitable for use in the disclosure herein may have an aromatic content above about 60%. In more specific examples, polyaromatic hydrocarbon sources suitable for use in the disclosure herein may have an aromatic content about 80% or above and a ratio of carbon to hydrogen of about 1.4:1 or lower.

The proppant particulates described herein may be prepared by reacting a polyaromatic hydrocarbon with a crosslinking agent comprising at least two reactive functional groups. The at least two reactive functional groups convey bifunctional reactivity upon a linker bridging a first polyaromatic hydrocarbon molecule to at least a second polyaromatic hydrocarbon molecule. The crosslinking chemistries described herein are acid-catalyzed and are believed to proceed through a carbocation intermediate in an electrophilic aromatic substitution reaction. A variety of acid catalysts may be employed for this purpose.

The acid-catalyzed crosslinking of polyaromatic hydrocarbons according to the present disclosure takes place in the presence of a surfactant. The surfactant provides several advantageous and surprising benefits. First, the surfactant allows the crosslinking chemistry to take place in water or other substantially aqueous solvents, in contrast to many traditional electrophilic aromatic substitution reactions in which water tends to reduce the activity of the acid catalyst. At the very least, the use of water or other substantially aqueous solvents as a reaction medium provides environmental advantages over syntheses employing only organic solvents. Second, the surfactant may promote micellar dispersion of the polyaromatic hydrocarbon and the crosslinking agent in the solvent. The micellar dispersion innately results in substantially spherical particle growth within the solvent up to a critical particulate size, at which point the surfactant is no longer able to maintain the particulates in a dispersed state. Without being bound by theory or mechanism, the substantially spherical particulate growth is believed to result from surface tension effects of the solvent upon the crosslinked product as the molecular weight increases. Thus, the present disclosure allows proppant particulates having a relatively uniform size distribution to be obtained via a straightforward synthetic procedure without having to perform a post-synthesis sizing operation. Moreover, by varying the reactant or the surfactant concentrations and/or by changing the surfactant itself, the size distribution of the proppant particulates may be varied in response to particular application needs. The crosslinking density of the proppant particulates may likewise be varied to change particulate hardness values in response to particular application needs.

Moreover, the ready formation of crosslinked polyaromatic hydrocarbons according to the present disclosure may allow in situ formation of proppant particulates to take place in a wellbore, according to some embodiments. In situ formation of proppant particulates may be particularly desirable in subterranean formations in which proppant delivery is otherwise difficult (e.g., tight formations having a small fracture size and/or a complex fracture network pattern). In situ formation of proppant particulates may likewise decrease or eliminate the need to utilize a gelled polymer to promote effective transport of the proppant particulates.

All numerical values within the detailed description and the claims herein are modified by "about" or "approximately" with respect to the indicated value, and take into account experimental error and variations that would be expected by a person having ordinary skill in the art. Unless otherwise indicated, room temperature is about 25° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A", and "B."

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides).

The term "hydrocarbon" refers to a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. The term "Cn" refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic.

The terms "saturated" or "saturated hydrocarbon" refer to a hydrocarbon or hydrocarbyl group in which all carbon atoms are bonded to four other atoms or are bonded to three other atoms with one unfilled valence position thereon.

The terms "unsaturated" or "unsaturated hydrocarbon" refer to a hydrocarbon or hydrocarbyl group in which one or more carbon atoms are bonded to less than four other atoms, optionally with one unfilled valence position on the one or more carbon atoms. More specifically, unsaturated carbon atoms may possess at least one carbon-carbon double bond and/or at least one carbon-carbon triple bond.

The terms "hydrocarbyl" and "hydrocarbyl group" are used interchangeably herein. The term "hydrocarbyl group" refers to any $C_1$-$C_{100}$ hydrocarbon group bearing at least one unfilled valence position when removed from a parent compound. "Hydrocarbyl groups" may be optionally substituted, in which the term "optionally substituted" refers to replacement of at least one hydrogen atom or at least one carbon atom with a heteroatom or heteroatom functional group. Heteroatoms may include, but are not limited to, B, O, N, S, P, F, Cl, Br, I, Si, Pb, Ge, Sn, As, Sb, Se, and Te. Heteroatom functional groups that may be present in substituted hydrocarbyl groups include, but are not limited to, functional groups such as O, S, S=O, S(=O)$_2$, NO$_2$, F, Cl, Br, I, NR$_7$, OR, SeR, TeR, PR$_2$, AsR$_2$, SbR$_2$, SR, BR$_2$, SiR$_3$, GeR$_3$, SnR$_3$, PbR$_3$, where R is a hydrocarbyl group or H. Suitable hydrocarbyl groups may include alkyl, alkenyl, alkynyl, aryl, aralkyl, heteroaryl, cycloalkyl, heterocyclyl, and the like, any of which may be optionally substituted.

The term "alkyl" refers to a hydrocarbyl group having no unsaturated carbon-carbon bonds, and which may be optionally substituted. The term "alkylene" refers to an alkyl group having at least two open valence positions.

The term "alkenyl" refers to a hydrocarbyl group having a carbon-carbon double bond, and which may be optionally substituted. The terms "alkene" and "olefin" are used synonymously herein. Similarly, the terms "alkenic" and "olefinic" are used synonymously herein. Unless otherwise noted, all possible geometric isomers are encompassed by these terms. The term "diene" refers to an alkenyl group having two carbon-carbon double bonds.

The terms "aromatic" and "aromatic hydrocarbon" refer to a hydrocarbon or hydrocarbyl group having a cyclic arrangement of conjugated pi-electrons that satisfy the Mickel rule. The term "aryl" is equivalent to the term "aromatic" as defined herein. The term "aryl" refers to both aromatic compounds and heteroaromatic compounds, either of which may be optionally substituted. Both mononuclear and polynuclear aromatic and heteroaromatic compounds are encompassed by these terms. The term "arylene" refers to an aryl group having at least two open valence positions.

Examples of saturated hydrocarbyl groups include, but are not limited to, methyl, ethyl, n-propyl, isopropyl, n-butyl, isobutyl, sec-butyl, tert-butyl, pentyl, isopentyl, hexyl, octyl, cyclopropyl, cyclobutyl, cyclopentyl, cyclohexyl, cyclooctyl, and the like, including their substituted analogues. Examples of unsaturated hydrocarbyl groups include, but are not limited to, ethenyl, propenyl, allyl, butadienyl, cyclopropenyl, cyclobutenyl, cyclopentenyl, cyclohexenyl, cyclooctenyl and the like, including their substituted analogues.

Examples of aromatic hydrocarbyl groups include, but are not limited to, phenyl, tolyl, xylyl, naphthyl, and the like, including all possible isomeric forms thereof. Heteroaryl and polynuclear heteroaryl groups may include, but are not limited to, pyridine, quinoline, isoquinoline, pyrimidine, quinazoline, acridine, pyrazine, quinoxaline, imidazole, benzimidazole, pyrazole, benzopyrazole, oxazole, benzoxazole, isoxazole, benzisoxazole, imidazoline, thiophene, benzothiophene, furan and benzofuran. Polynuclear aryl hydrocarbyl groups may include, but are not limited to, naphthalene, anthracene, indane, indene, and tetralin.

The term "polyaromatic hydrocarbon" refers to a hydrocarbyl group bearing at least two aromatic rings, which may be fused or unfused. Optional heteroatom substitution may be present in at least one of the at least two aromatic rings.

The term "linear" refers to a hydrocarbon or hydrocarbyl group having a continuous carbon chain without side chain branching, in which the continuous carbon chain may be optionally substituted with heteroatoms or heteroatom groups.

The terms "branch" and "branched" refer to a hydrocarbon or hydrocarbyl group having a linear main carbon chain or cyclic carbon ring in which a hydrocarbyl side chain extends from the linear main carbon chain or cyclic carbon ring. Optional heteroatom substitution may be present in the linear main carbon chain, the cyclic carbon ring, or in the hydrocarbyl side chain.

The term "benzylic" refers to a sp$^3$ carbon atom directly bonded to an aromatic or heteroaromatic ring.

The term "allylic" refers to a sp$^3$ carbon atom directly bonded to an olefinic carbon atom.

The present disclosure describes solid compositions that are a crosslinked reaction product of a polyaromatic hydrocarbon and a crosslinking agent. The crosslinking agent comprises at least two functional groups that are reactive under acid-catalyzed conditions with an aromatic ring of the polyaromatic hydrocarbon. The crosslinked reaction product is formed as substantially spherical particulates.

In general, the solid compositions of the present disclosure feature crosslinked reaction products having a substructure defined by Formula 1 below, PAH1-L-PAH2    Formula 1 wherein PAH1 and PAH2 are first and second polyaromatic hydrocarbons and L is a crosslinking group forming a bridge between PAH1 and PAH2. The crosslinking group is the entity resulting from a reaction between a given polyaromatic hydrocarbon and a suitable crosslinking agent, examples of which are disclosed herein below. The entity defining crosslinking group L may or may not comprise the entirety of a reactive functional group that undergoes a reaction with a polyaromatic hydrocarbon. That is, some reactive functional groups may undergo a reaction with a polyaromatic hydrocarbon directly without losing an atom to form a reactive species, whereas other reactive functional groups may lose one or more atoms or be lost altogether when forming a reactive species to promote reactivity with a polyaromatic hydrocarbon. For example, alkyl and acyl halides may lose a halogen atom to form an electrophile suitable for functionalizing an aromatic ring of a polyaromatic hydrocarbon according to some embodiments of the present disclosure.

Although not shown in Formula 1 above, PAH1 and/or PAH2 may be further crosslinked to additional polyaromatic hydrocarbons. Alternately or in addition, multiple crosslinking groups may extend between PAH1 and PAH2 and/or additional polyaromatic hydrocarbons, in some embodiments. When multiple crosslinking groups are present, they may extend between the same aromatic ring and/or different aromatic rings of each polyaromatic hydrocarbon.

In some embodiments, suitable crosslinking agents may have a structure shown in Formula 2,

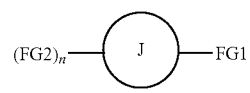

Formula 2 wherein J is a spacer group defining at least a portion of crosslinking group L (Formula 1), FG1 is a first reactive functional group and (FG2)$_n$ is at least a second reactive functional group, wherein n is an integer ranging from 1 to the number of open valence positions in J. For example, when J is an aromatic ring, n may vary up to the number of open valence positions (unsubstituted aromatic ring carbon atoms) in the aromatic ring. FG1 and FG2 may be the same or different in a given crosslinking agent. Particular crosslinking agents shown below feature both reactive functional groups as the same. Suitable crosslinking agents may be chosen with reactive functional groups capable of producing an electrophile that may react with one or more aromatic rings of a polyaromatic hydrocarbon. Examples of reactive functional groups that may be present in the crosslinking agents suitable for use in the present disclosure include, for example, alkenes (including styrenes and other vinyl aromatic compounds), aldehydes, benzylic halides, benzylic alcohols, benzylic sulfonates, acyl halides, carboxylic acids, carboxylic anhydrides, and the like.

In some more specific embodiments, crosslinking agents suitable for use in the present disclosure may have Formula 3 below, in which J is a phenyl ring and Q represents optional functionality that may be present but does not play a role in crosslinking to a polyaromatic hydrocarbon.

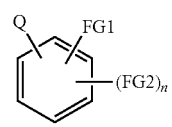

Formula 3

The reactive functional groups upon the aromatic ring may be the same or different, and any substitution pattern of the reactive functional groups may be present. In particular embodiments, two of the same type of reactive functional group may be present (i.e., FG1=FG2). Again, any of the reactive functional groups discussed above may be present. Particular examples of aromatic crosslinking agents bearing such reactive functional groups include, for example, the compounds represented by Formula 4 below, wherein FG1 and FG2 are independently selected from —CHO, —CHCH$_2$, —CH$_2$X (X=halide, OH, or sulfonate), and —COY (Y=halide, OH or O-acyl).

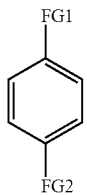

Formula 4

Again, it is to be appreciated that FG1 and FG2 may be the same or different. Although Formula 4 has shown a p-di-substituted aromatic ring, it is to be appreciated that o- or m-di-substituted aromatic ring variants may function similarly during crosslinking.

Other suitable crosslinking agents may be based upon a naphthalene or biaryl scaffold, as shown in Formulas 5 and 6 below, wherein FG1, FG2 and Q are defined as above and $y_1$ and $y_2$ are integers ranging from 0 up to the number of open valence positions in each corresponding aromatic ring, provided that at least two reactive functional groups are present in a given crosslinking agent (i.e., $y_1+y_2 \geq 2$). That is, the reactive functional groups may be present upon the same or different aromatic rings in the crosslinking agents defined by Formulas 5 and 6.

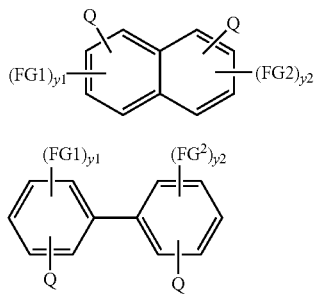

Formula 5

Formula 6

Still other suitable crosslinking agents may be polymeric in nature. Exemplary polymeric crosslinking agents that may be used to promote crosslinking of polyaromatic hydrocarbons according to the present disclosure are shown in Formulas 7 and 8 below, wherein FG may be selected from the reactive functional groups specified above.

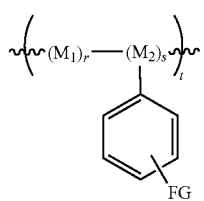

Formula 7

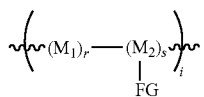

Formula 8

In Formulas 7 and 8, $M_1$ is a first monomer unit and $M_2$ is a second monomer unit (mer unit), which may be the same or different. Variables r and s are 0 or a positive integer, provided that $r+s \geq 1$, and t is a positive integer ranging from 1 to about 1,000,000. Each reactive functional group in a polymeric crosslinking agent may be the same or different. Particular examples of polymeric crosslinking agents that may be suitable for use in the disclosure herein include, for example, poly(formylstyrene), poly(vinylstyrene), poly(halobenzylstyrene), poly(hydroxybenzyl)styrene, polyvinylchloride, and polybutadiene, including any homopolymer or copolymer thereof. Thus, although Formulas 7 and 8 have been shown as copolymers, wherein one of the mer units bears the reactive functional groups, it is to be appreciated that homopolymers bearing a reactive functional group upon each mer unit may also constitute suitable crosslinking agents in the embodiments of the present disclosure.

In still other embodiments, suitable crosslinking agents may include dicyclopentadiene or any alkylated variant thereof. According to the present disclosure, both double bonds in dicyclopentadiene (Formula 9) may be reacted with a polyaromatic hydrocarbon under acid-catalyzed conditions to form a crosslinked reaction product.

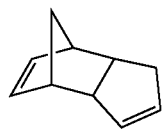

Formula 9

Accordingly, in some embodiments of the present disclosure, the at least two functional groups in the crosslinking agents of the present disclosure may be located upon one or more aromatic rings of the crosslinking agent. In more specific embodiments, the at least two functional groups may be independently selected from —CHO, —CHCH$_2$, —CH$_2$X (X=halide, OH, or sulfonate) and C(=O)Y= (Y=OH, Cl, and O-acyl). In some embodiments, the crosslinking agent may be a polymeric crosslinking agent.

The solid compositions disclosed herein feature crosslinked reaction products that may be formed as substantially spherical particulates. The term "substantially spherical" refers to both true spherical particulates and ovular particulates, wherein ovular particulates may have a minor axis length differing from a major axis length by about 10% or less. Alternately, the assignment of a particulate as being "substantially spherical" may be determined from a Krumbien/Sloss chart, as specified in ISO13503-2:2006, wherein a substantially spherical particulate has x and y values on the Krumbien/Sloss chart that are both greater than or equal to 0.6. Irregular surface features, including microscopic surface features not visible to the naked eye, upon particulates that are otherwise substantially spherical also reside within the scope of the present disclosure. Agglomerates of substantially spherical particulates likewise reside within the scope of the present disclosure.

In more particular embodiments, substantially spherical particulates of the present disclosure may have a particle size ranging from about 10 microns to about 3 mm or about 100 microns to about 1 mm. It is to be appreciated that the particle size may be varied in response to particular application needs during production of the substantially spherical particulates. Methods for producing substantially spherical particulates from polyaromatic hydrocarbons are discussed in further detail herein below.

In some or other embodiments, substantially spherical particulates of the present disclosure may have a density ranging from about 0.8 g/cm³ to about 1.5 g/cm³ or from about 1.0 g/cm³ to about 1.5 g/cm³.

Crush strength values for the substantially spherical particulates of the present disclosure may be determined using ISO 13503-2, which provides a weight percentage of fines formed at a given stress level. In particular embodiments, no fines may be formed from certain substantially spherical particulates disclosed herein at stress levels up to about 5000 psi.

Polyaromatic hydrocarbons suitable for forming the crosslinked reaction products of the present disclosure may be obtained from any source and have any molecular structure, provided that the molecular structure is capable of forming substantially spherical particulates following crosslinking. The polyaromatic hydrocarbons may comprise only carbon and hydrogen, or optional heteroatoms may be present in some embodiments. Heteroatoms such as nitrogen or sulfur, for example, may replace one or more ring carbon atoms defining a portion of the polyaromatic hydrocarbons suitable for use in the disclosure herein.

Additionally, in some embodiments, suitable polyaromatic hydrocarbons may be further oxidized either before or after undergoing crosslinking according to the disclosure herein. Thus, in some embodiments, the crosslinked reaction products of the present disclosure may comprise one or more oxidized aromatic rings. Oxidized variants of suitable polyaromatic hydrocarbons or crosslinked forms thereof may bear an oxygen atom upon an aromatic ring carbon atom (e.g., as a catechol, quinone or epoxide), or ring opening to a dicarboxylic acid may occur in some instances.

Polyaromatic hydrocarbons bearing a heteroatom, particularly sulfur, may be oxidized upon the heteroatom (e.g., as a sulfoxide, sulfone or sulfonic acid). Reagents such as hydrogen peroxide or sulfuric acid, for example, may promote the oxidation reaction.

Particularly suitable polyaromatic hydrocarbons for forming the crosslinked reaction products of the present disclosure may be obtained from various refinery process streams that otherwise have low intrinsic value, oftentimes a waste stream. By forming a crosslinked reaction product according to the disclosure herein, a considerably more valuable and useful material may be obtained. In illustrative embodiments, refinery process streams containing polyaromatic hydrocarbons suitable for use in the disclosure herein may include, for example, steam cracker tar, main column bottoms, vacuum residue, C5 rock, C3-05 rock, slurry oil, asphaltenes, bitumen, K-pot bottoms, lube extracts, and any combination thereof. These terms will be familiar to one having ordinary skill in the art. Particular discussion regarding these refinery process streams is provided hereinafter.

Steam cracker tar (also referred to as steam cracked tar or pyrolysis fuel oil) may comprise a suitable source of polyaromatic hydrocarbons in some embodiments of the present disclosure. "Steam cracker tar" is the high molecular weight material obtained following pyrolysis of a hydrocarbon feedstock into olefins, as described, for example, in U.S. Pat. No. 8,709,233, which is incorporated herein by reference. Suitable steam cracker tar may or may not have had asphaltenes removed therefrom. Steam cracker tar may be obtained from the first fractionator downstream from a steam cracker (pyrolysis furnace) as the bottoms product of the fractionator, nominally having a boiling point of 550° F. or above (288° C. or above) and higher. In particular embodiments, steam cracker tar may be obtained from a pyrolysis furnace producing a vapor phase to including ethylene, propylene, and butenes; a liquid phase separated as an overhead phase in a primary fractionation step comprising $C_{5+}$ species including a naphtha fraction (e.g., $C_5$-$C_{10}$ species) and a steam cracked gas oil fraction (primarily $C_{10}$-$C_{15}$/$C_{17}$ species having an initial boiling range of about 400° F. to 550° F.); and a bottoms fraction comprising steam cracker tar having a boiling point range above about 550° F. and comprising $C_{15}$/$C_{17+}$ species.

Main column bottoms (also referred to as FCC main column bottoms or slurry oil) may comprise a suitable source of polyaromatic hydrocarbons in some embodiments of the present disclosure. Typical polyaromatic hydrocarbons that may be present in main column bottoms include those having molecular weights ranging from about 250 to about 1000. Three to eight fused aromatic rings may be present in some instances. Polyaromatic hydrocarbons that may be present in main column bottoms include, but are not limited to, those shown in Formulas 10-21 below.

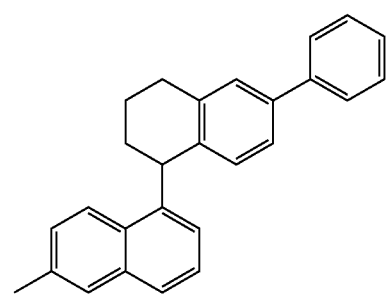

Formula 10

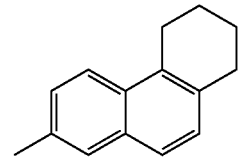

Formula 11

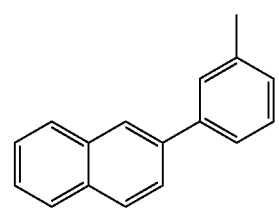

Formula 12

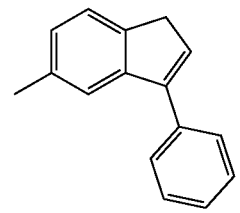

Formula 13

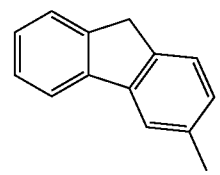

Formula 14

Formula 15

Formula 16

Formula 17

Formula 18

Formula 19

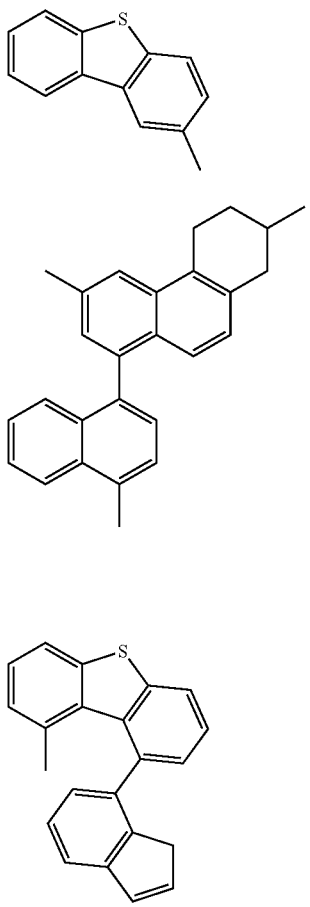

Formula 20

Formula 21

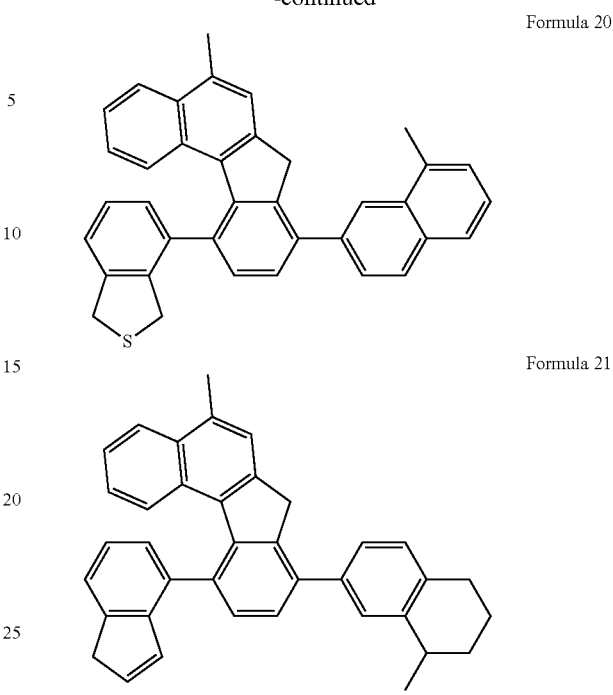

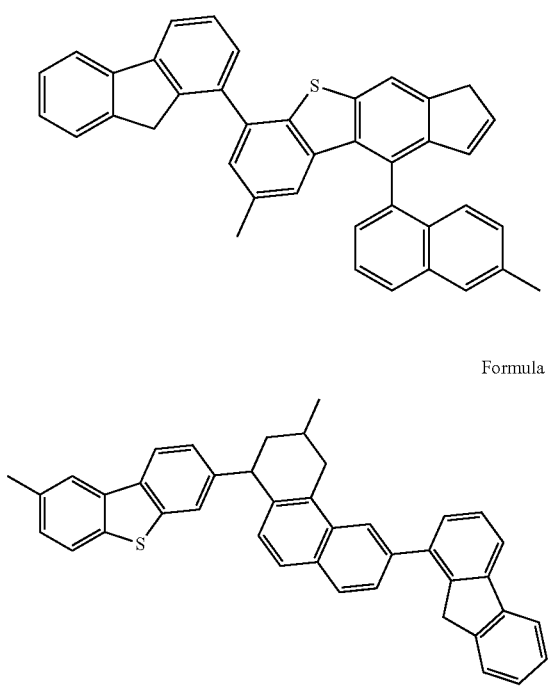

Suitable main column bottoms may or may not have had asphaltenes removed therefrom. Residual cracking catalyst not removed cyclonically following cracking may or may not remain present in the main column bottoms. Both catalyst-containing and catalyst-free main column bottoms may be suitable for use in the present disclosure.

Vacuum residue may comprise a suitable source of polyaromatic hydrocarbons in some embodiments of the present disclosure. Like its name suggests, "vacuum residue" is the residual material obtained from a distillation tower following vacuum distillation. Vacuum residue may have a nominal boiling point range of about 600° C. or higher.

C3 rock or C3-C5 rock may comprise a suitable source of polyaromatic hydrocarbons in some embodiments of the present disclosure. C3-C5 rock refers to asphaltenes that have been further treated with propane, butanes and pentanes in a deasphalting unit. Likewise, C3 rock refers to asphaltenes that have been further treated with propane. C3 and C3-C5 rock may be high in metals like Ni and V and may contain high amounts of N and S heteroatoms in heteroaromatic rings.

Bitumen or asphaltenes may comprise a suitable source of polyaromatic hydrocarbons in some embodiments of the present disclosure. Some sources consider bitumen and asphaltenes to be synonymous with one another. In general, asphaltenes refer to a solubility class of materials that precipitate or separate from an oil when in contact with paraffins (e.g., propane, butane, pentane, hexane or heptane). Bitumen traditionally refers to a material obtained from oil sands and represents a full-range, higher-boiling material than raw petroleum.

In addition to the crosslinked reaction product, various additives may further be combined therewith to alter the resulting properties of the substantially spherical particulates. Suitable additives may include, for example, plasticizers, polymers, oils, fillers, and the like.

The substantially spherical particulates described hereinabove may be readily prepared under acid-catalyzed conditions in an aqueous or substantially aqueous solvent in the presence of a surfactant. The surfactant promotes dispersion of the polyaromatic hydrocarbon, thereby allowing small droplets of the polyaromatic hydrocarbon to undergo interfacial crosslinking in the solvent. The surface tension of the water thereby encourages formation of substantially spherical particulates, which eventually precipitate from the solvent once the surfactant is no longer capable of promoting dispersion (e.g., once a critical particle size has been reached).

Accordingly, methods for synthesizing substantially spherical particulates of the present disclosure may comprise: reacting a polyaromatic hydrocarbon with a crosslinking agent in the presence of an acid catalyst and a surfactant in an aqueous solvent, and forming substantially spherical particulates in situ in the aqueous solvent in the presence of the surfactant. The substantially spherical particulates comprise a crosslinked reaction product of the polyaromatic hydrocarbon and the crosslinking agent, wherein the crosslinked reaction product is described in further detail hereinabove.

Temperature conditions suitable for forming the crosslinked reaction products of the present disclosure may vary over a wide range. In general, any reaction temperature may be used at which the aqueous solvent remains a liquid. For example, in some embodiments, the reaction temperature may range from about −10° C. to about 100° C., or 0° C. to about 90° C. Reactions under pressurized conditions are also possible, in which case the reaction temperature may be up to about 370° C., for example, in a range from about 100° C. to about 200° C.

Any of the crosslinking agents discussed above may be used to form a crosslinked reaction product of the present disclosure in the presence of a surfactant. Similarly, any polyaromatic hydrocarbon capable of reacting with a crosslinking agent to form substantially spherical particulates may be utilized in the disclosure herein.

As referenced above, the size of the substantially spherical particulates described herein may be adjusted by a number of factors including, for example, the concentration and type of surfactant used when forming the crosslinked reaction product. Namely, the concentration and type of surfactant may be chosen such that the crosslinked reaction product remains dispersed in the aqueous solvent until a critical particle size is reached, at which point precipitation of the substantially spherical particulates occurs. Thus, suitable surfactants thereof are not believed to be particularly limited, provided that the surfactant is capable of dispersing the polyaromatic hydrocarbon and promoting a reaction between the polyaromatic hydrocarbon and the crosslinking agent to yield a desired particle size. Suitable surfactants may include cationic surfactants, anionic surfactants, neutral surfactants, zwitterionic surfactants, and any combination thereof. Particular examples of suitable surfactants may include, for example, dodecyltrimethylammonium bromide and 4-dodecylbenzenesulfonic acid.

Likewise, the concentration of the surfactant in the aqueous solvent may be varied over a range of values in response to the size of the substantially spherical particulates to be produced. In various embodiments, a concentration of the surfactant in the aqueous solvent may range from about 0.1 to about 10% (w/v) or about 0.5 to about 10% (w/v). In some or other embodiments, a concentration of the surfactant may range from $1 \times 10^{-3}$ M to about $10^{-5}$ M. Concentrations in the latter range may be particularly effective for promoting micelle formation.

Polyaromatic hydrocarbons suitable for use in forming the substantially spherical particulates of the present disclosure is not believed to be particularly limited. Particular examples of suitable polyaromatic hydrocarbons may include one or more of the refinery process streams described hereinabove. In particular embodiments, suitable polyaromatic hydrocarbons may have a boiling point of about 800° F. or higher. In some or other particular embodiments, suitable polyaromatic hydrocarbons may have a hydrogen content of about 4% to about 20% on a mass basis.

The concentration of the polyaromatic hydrocarbon in the aqueous solvent may range from about 0.1% to about 90% (w/v) or about 1% to about 50% (w/v), or about 2% to about 15%.

Crosslinking agents suitable for use in forming the substantially spherical particulates of the present disclosure are likewise not believed to be particularly limited, provided that the crosslinking agents are reactive with an aromatic ring in an aqueous solvent in some manner. Particular examples of suitable crosslinking agents may include any of the crosslinking agents described above, which may undergo a reaction under acid-catalyzed conditions with an aromatic ring.

Depending on the desired particle size and/or the crosslink density of the substantially spherical particulates, the concentration of the crosslinking agent in the aqueous solvent may vary over a considerable range. In some embodiments, the crosslinking agent may be present in an amount ranging from about 0.1% to about 100% w/w of a total weight of the polyaromatic hydrocarbon. In more particular embodiments, the crosslinking agent may be present in an amount ranging from about 20% to about 100% w/w of a total weight of the polyaromatic hydrocarbons, or about 20% to about 90% w/w, or about 20% to about 80% w/w, or about 20% to about 70% w/w, or about 20% to about 65% w/w, or about 20% to about 50% w/w, or about 20% to about 40% w/w, or about 20% to about 30% w/w, or about 30% to about 90% w/w, or about 30% to about 80% w/w, or about 30% to about 70% w/w, or about 30% to about 60% w/w, or about 30% to about 50% w/w, or about 30% to about 40% w/w, or about 40% to about 90% w/w, or about 40% to about 80% w/w, or about 40% to about 70% w/w, or about 40% to about 60% w/w, or about 40% to about 50% w/w, or about 50% to about 90% w/w, or about 50% to about 80% w/w, or about 50% to about 70% w/w, or about 50% to about 60% w/w, or about 60% to about 90% w/w, or about 60% to about 80% w/w, or about 60% to about 70% w/w, or about 70% to about 90% w/w, or about 70% to about 80% w/w, or about 80% to about 90% w/w.

Acid catalysts suitable for promoting a reaction between a polyaromatic hydrocarbon and a crosslinking agent according to the present disclosure may vary as well. Suitable acid catalysts may include, for example, mineral acids, organic acids, supported acids, Lewis acids, and the like. Particular examples of suitable acid catalysts may include, for example, trimethylaluminum, aluminum chloride, zinc chloride, ferric chloride, methanesulfonic acid, trifluoromethanesulfonic acid, trichloroacetic acid, p-toluenesulfonic acid, phosphoric acid, polyphosphoric acid, tungstic acid, phosphotungstic acid, polyoxometalates, naphthalenesulfonic acid, benzenesulfonic acid, sulfuric acid, hydrochloric acid, hydrobromic acid, biphenylsulfonic acid, benzenetrisulfonic acid, and the like. Combinations of Lewis acids and protic (Bronsted) acids may be used in some instances.

The concentration of the acid catalyst in the aqueous solvent may range from about 1% to about 50% (w/v). In some or other embodiments, an amount of the acid catalyst may range from about 0.1% to about 50% w/w of the total weight of the crosslinking agent and the polyaromatic hydrocarbon, or about 0.1% to about 40% w/w, or about 0.1% to about 40%, or about 0.1% to about 30%, or about 0.1% to about 20%, or about 0.1% to about 10%, or about 0.5% to about 40%, or about 0.5% to about 30%, or about 0.5% to about 20%, or about 0.5% to about 10%, or about 1% to about 40%, or about 1% to about 30%, or about 1% to about 20%, or about 1% to about 10% w/w.

In certain embodiments, the reactive functional group of the crosslinking agent and an acid group for promoting functionalization of the polyaromatic hydrocarbon may be present in the same molecule. For example, in some embodiments, crosslinking agents containing a suitable acid group may be polymeric, such as the illustrative polymeric crosslinking agents shown in Formulas 22 and 23,

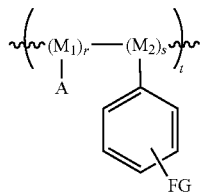

Formula 22

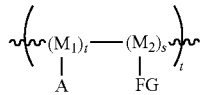

Formula 23 wherein A is a suitable acid group such as a sulfonic acid, phosphonic acid, or carboxylic acid.

In still other embodiments, the present disclosure provides fracturing methods utilizing the substantially spherical particulates disclosed hereinabove. The substantially spherical particulates may function as proppants when employed in a fracturing operation, as described hereinafter.

In various embodiments, fracturing methods of the present disclosure may comprise: providing a plurality of proppant particulates comprising a crosslinked reaction product of a polyaromatic hydrocarbon and a crosslinking agent, in which the reaction product is formed as substantially spherical particulates; introducing a fracturing fluid comprising the plurality of proppant particulates into a subterranean formation; and depositing at least a portion of the plurality of proppant particulates within one or more fractures in the subterranean formation. Any of the substantially spherical particulates described hereinabove may be utilized in the fracturing methods discussed below.

Further embodiments of the fracturing methods may comprise combining the plurality of proppant particulates with a suitable carrier fluid to transport the proppant particulates into a desired location in the subterranean formation. The carrier fluid may comprise an aqueous fluid, according to various embodiments of the present disclosure. In other illustrative embodiments, the plurality of proppant particulates may be combined in a separate fluid that is subsequently injected into the fracturing fluid, possibly on-the-fly, as the fracturing fluid is being pumped into the subterranean formation.

In more specific embodiments, the fracturing fluid may be introduced to the subterranean formation at a pressure sufficient to create or extend at least one fracture within a matrix of the subterranean formation. Such pressures may be referred to as being above the fracture gradient pressure of the subterranean formation. One having ordinary skill in the art will be able to determine a suitable pressure for introducing a fracturing fluid of the present disclosure in order to realize the benefits and advantages described herein.

In other embodiments, a pad fluid lacking the proppant particulates may be introduced initially to the subterranean formation at or above the fracture gradient pressure. Thereafter, once a plurality of fractures has been created or extended, the proppant particulates may be introduced to the subterranean formation to prevent the fractures from closing following a release of the hydraulic pressure.

In some embodiments, the plurality of proppant particulates may be synthesized prior to formulating the fracturing fluid. That is, the proppant particulates may be synthesized as described in further detail herein and then undergo combination with the fracturing fluid. The proppant particulates may be present in any suitable amount in the fracturing fluid to promote a particular fracturing operation.

In other embodiments, methods of the present disclosure may further comprise forming the plurality of proppant particulates in situ within the fracturing fluid. More specifically, in such embodiments, the fracturing fluid may be an aqueous fracturing fluid comprising a polyaromatic hydrocarbon, a crosslinking agent, an acid catalyst, and a surfactant, suitable examples and amounts of which are described in detail hereinabove. Amounts and types of each of these components may be chosen such that the proppant particulates are formed in situ in a desired location within the subterranean formation.

Fracturing fluids of the present disclosure may be gelled or ungelled, depending on particular application needs. Advantageously, since the crosslinked reaction products of the present disclosure exhibit relatively low density values, gelling of the carrier fluid may not be needed to promote particulate transport. Similarly, when the proppant particulates are formed in situ, gelling of the fracturing fluid may be unnecessary.

The types of subterranean formations that may undergo fracturing according to the disclosure herein are not believed to be particularly limited. Particular examples of subterranean formations that may undergo fracturing according to the present disclosure include, for example, shale formations, oil sands, gas sands, and the like In addition, certain fracturing fluids suitable for use in the disclosure herein may contain one or more additives such as, for example, salts, weighting agents, inert solids, fluid loss control agents, emulsifiers, dispersion aids, corrosion inhibitors, emulsion thinners, emulsion thickeners, viscosifying agents, particulates, lost circulation materials, foaming agents, gases, pH control additives, buffers, breakers, biocides, crosslinkers, stabilizers, chelating agents, scale inhibitors, mutual solvents, oxidizers, reducers, friction reducers, clay stabilizing agents, and any combination thereof. One having ordinary skill in the art will be familiar with such additives and amount thereof to use in a given fracturing fluid.

Embodiments disclosed herein include:

A. Solids compositions comprising substantially spherical particulates. The compositions comprise: a crosslinked reaction product of a polyaromatic hydrocarbon and a crosslinking agent, the crosslinking agent comprising at least two functional groups that are reactive under acid-catalyzed conditions with an aromatic ring of the polyaromatic hydrocarbon; wherein the crosslinked reaction product is formed as substantially spherical particulates.

B. Methods for forming substantially spherical particulates. The methods comprise: reacting a polyaromatic hydrocarbon with a crosslinking agent in the presence of an acid catalyst and a surfactant in an aqueous solvent; and forming substantially spherical particulates in situ in the aqueous solvent, the substantially spherical particulates comprising a crosslinked reaction product of the polyaromatic hydrocarbon and the crosslinking agent.

C. Methods for fracturing a subterranean formation. The methods comprise: providing a plurality of proppant particulates comprising a crosslinked reaction product of a polyaromatic hydrocarbon and a crosslinking agent, the crosslinked reaction product being formed as substantially spherical particulates; introducing a fracturing fluid comprising the plurality of proppant particulates into a subterranean formation; and depositing at least a portion of the plurality of proppant particulates within one or more fractures in the subterranean formation.

Embodiments A-C may have one or more of the following additional elements in any combination:

Element 1: wherein the substantially spherical particulates have a particle size ranging from about 10 microns to about 3 mm.

Element 2: wherein the at least two functional groups are located upon one or more aromatic rings of the crosslinking agent.

Element 3: wherein the at least two functional groups are independently selected from the group consisting of —CHO, —CHCH$_2$, —CH$_2$X, —C(=O)Y, and any combination thereof; wherein X is selected from the group consisting of halide, OH, and sulfonate; and wherein Y is selected from the group consisting of OH, Cl, and O-acyl.

Element 4: wherein the crosslinking agent is a polymeric crosslinking agent.

Element 5: wherein the polyaromatic hydrocarbon is obtained from a refinery process stream.

Element 6: wherein the refinery process stream is selected from the group consisting of steam cracked tar, main column bottoms, vacuum residue, C5 rock, C3-05 rock, asphaltenes, bitumen, K-pot bottoms, lube extracts, and any combination thereof.

Element 7: wherein the crosslinked reaction product comprises one or more oxidized aromatic rings.

Element 8: wherein the fracturing fluid is introduced into the subterranean formation at or above a fracture gradient pressure of the subterranean formation.

Element 9: wherein the method further comprises: forming the plurality of proppant particulates in situ within the fracturing fluid; wherein the fracturing fluid is an aqueous fracturing fluid comprising the polyaromatic hydrocarbon, the crosslinking agent, an acid catalyst, and a surfactant.

Element 10: wherein the crosslinking agent comprises at least two functional groups that are reactive under acid-catalyzed conditions with an aromatic ring of the polyaromatic hydrocarbon.

By way of non-limiting example, exemplary combinations applicable to A, B and C include: 1 and 2; 1-3, 1 and 4; 1 and 5; 1, 5 and 6; 1 and 7; 2 and 3; 2 and 4; 2 and 5; 2, 5 and 6; 2 and 7; 3 and 5; 3, 5 and 6; 3 and 7; 4 and 5; 4, 5 and 6; 4 and 7; 5 and 7; and 5, 6 and 7. Optionally, embodiment C may further include the following exemplary combinations, either alone or in further combination with any one or more of elements 1-10: 8 and 9, 8 and 10; 9 and 10; and 8-10.

To facilitate a better understanding of the embodiments described herein, the following examples of various representative embodiments are given. In no way should the following examples be read to limit, or to define, the scope of the present disclosure.

EXAMPLES

Example 1

A reaction mixture was formed by combining 1 g of Aromatic 200 (ExxonMobil Chemical Company, a mixture of C9-C15 aromatic hydrocarbons) and 5 g of divinylbenzene in 10 g of water containing 1 wt. % surfactant and 5 wt. % bismuth triflate catalyst. The reaction mixture was stirred continuously and allowed to react at 90° C. overnight. The resulting product was yellowish and formed spherical particulates in the millimeter size range. Some particulate agglomeration occurred during the reaction.

Example 2

A reaction mixture was formed by combining 1 g of Aromatic 200 (ExxonMobil Chemical Company, a mixture of C9-C15 aromatic hydrocarbons) and 5 g of divinylbenzene in 20 g of water containing 5 wt. % 4-dodecylbenzenesulfonic acid surfactant and 20 mg Yb(OTf)$_3$ catalyst. The reaction mixture was stirred continuously at 300 rpm and allowed to react at 90° C. overnight. The resulting product was yellowish and formed spherical particulates in the millimeter size range. Some particulate agglomeration occurred during the reaction.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

The invention claimed is:

1. A method comprising:
    reacting at least one polymer having at least one C9-C15 aromatic hydrocarbon unit with a crosslinking agent in the presence of an acid catalyst and a surfactant in an aqueous solvent, the crosslinking agent comprising at least two functional groups that are reactive under acid-catalyzed conditions with an aromatic ring of the at least one C9-C15 aromatic hydrocarbon unit and comprising a phenyl group and at least two C2 groups bonded to the phenyl group; and
    forming substantially spherical particulates in situ in the aqueous solvent, the
    substantially spherical particulates comprising a crosslinked reaction product of the at least one C9-C15 aromatic hydrocarbon unit and the at least one crosslinking agent, wherein the at least one C9-C15 aromatic hydrocarbon unit and the at least one crosslinking agent are crosslinked in the crosslinked reaction product by a C2 group of two C2 groups bonded directly to an aromatic ring of the at least one C9-C15 aromatic hydrocarbon unit and bonded directly to a phenyl group of the crosslinking agent.

2. The method of claim 1, wherein the substantially spherical particulates have a particle size ranging from about 10 microns to about 3 mm.

3. The method of claim 1, wherein the at least two functional groups are independently selected from the group consisting of —CHO, —CHCH2, —CH2X, —C(=O)Y, and any combination thereof;
    wherein X is selected from the group consisting of halide, OH, and sulfonate; and
    wherein Y is selected from the group consisting of OH, Cl, and O—C(=O)—R;
    wherein R is a hydrocarbyl group.

4. The method of claim 1, wherein the crosslinking group is a polymeric crosslinking group.

5. The method of claim 1, wherein the at least one C9-C15 aromatic hydrocarbon units is obtained from a refinery process stream.

6. The method of claim 5, wherein the refinery process stream is selected from the group consisting of steam cracked tar, main column bottoms, vacuum residue, asphaltenes, bitumen, lube extracts, and any combination thereof.

7. The method of claim 1, wherein the crosslinked reaction product comprises one or more oxidized aromatic rings.

* * * * *